Figure 1:
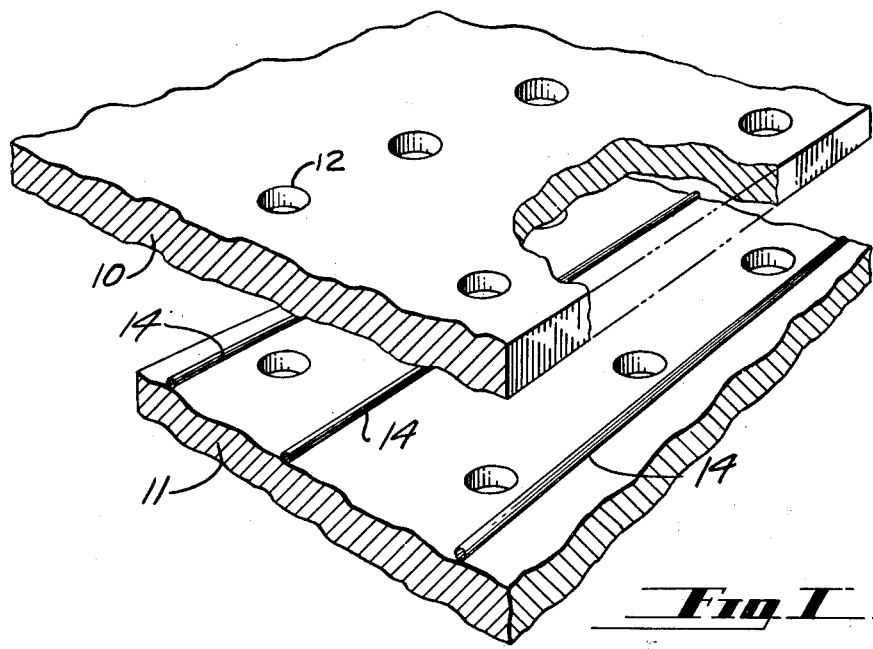

Sept. 6, 1949. P. L. SMITH ET AL 2,481,357
SEAL
Filed Oct. 31, 1945

INVENTOR.
PAUL L. SMITH
LEWIS E. WILLIAMS JR
BY Edwin Coates
ATTORNEY

Patented Sept. 6, 1949

2,481,357

UNITED STATES PATENT OFFICE 2,481,357

SEAL

Paul L. Smith and Lewis E. Williams, Jr., Los Angeles, Calif., assignors to Douglas Aircraft Company, Inc., Santa Monica, Calif.

Application October 31, 1945, Serial No. 625,778

5 Claims. (Cl. 189—36)

This invention relates to jointures and particularly to jointures for uniting sheet material parts in a fluid-tight manner.

Sheet material parts are usually joined by bonding, cementing, welding or riveting. In the latter case, the parts consist of sheet metal and unless a lining or a relatively large gasket member is employed, any fluid lying on one side of the joint eventually seeps through to the other side.

The present invention provides a fluid-tight joint for sheet material that is particularly well adapted for incorporation in sheet metal liquid containers, such as integral hydrocarbon containers. As will be made manifest, however, the inventive concepts for aircraft are equally well applicable in establishing air-tight joints in the plating of pressurized compartments; and to render water-tight the hulls and floats of marine vessels and water-borne aircraft. In fact, the invention is well adapted to replace the cementing, gasketing, bonding or other sealing means heretofore employed in joining substantially any kind of sheet material including plastics, veneer, and laminated materials.

The invention includes a joint essentially comprising two planar members united in facewise contact in mutual engagement with a flexible filariform sealing member disposed longitudinally therebetween. The sealing member has a high degree of radial elastic deformability and should be impervious to the liquid to be sealed. The member is preferably pre-drawn, or stretched longitudinally beyond its initial elastic limit, and hence will elastically follow the longitudinal working of the faying surfaces without locally constricting or "necking down." It also will resiliently yield under compression but will elastically expand to follow the radial working of the faying surfaces in such manner as to maintain the seal.

The filament is preferably of such a nature and of such small diameter as to be clampable between the faying surfaces without thereby producing appreciable corrugations of the exterior surface of the united parts, yet without the necessity of employing seating grooves or the like therefor in either faying surface.

The invention also contemplates that, in addition to constituting a mechanical barrier in this novel fashion, the sealing member should preferably also constitute a chemical barrier, being of such a composition as to be of itself insoluble at least in hydrocarbons, sea water, and sea air, or to hold a protective coating of a solvent and corrosive-resistant material.

To these ends, the filariform sealing member, in one of its embodiments, consists of an organic synthetic material pre-drawn beyond its initial elastic limit. The synthetic nylon is eminently suitable for this purpose. In the event that the nylon filament be provided with a protective coating, the invention includes within its scope, the use therefor of one of the synthetic rubbers known under the trade-marks "Thiokol," "Buna N," or "Neoprene."

In one mode of fabricating the joint, the planar members to be united are overlapped, with the filariform member disposed on one of them, longitudinally of the joint, and the overlapped members are united by rows of fasteners. The novel sealed joint thereby established is quite simple and unusually easy to fabricate, yet, by virtue of the nature and composition of the sealing member, will remain fluid-tight throughout long service under nearly all chemical and mechanical influences to which it may be subjected.

An embodiment of the invention in the jointure and seal of an integral fuel tank is hereinafter described in detail in conjunction with the accompanying drawings. It is to be understood, however, that this embodiment may be modified to any extent lying within the scope of the accompanying claims.

Figure 2:
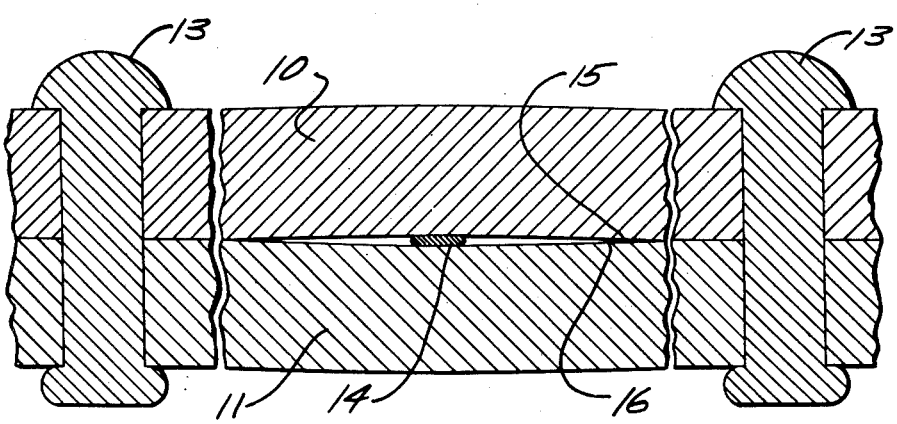

In these drawings:

Figure 1 is a fragmentary perspective view illustrating the seam portion of a sheet metal integral fuel tank provided with rows of openings for receiving fastening means, the novel sealing member being shown therein in the condition which it occupies before the final joining operation; and Figure 2 is a transverse section of the joint after riveting the same, the showing being exaggerated to more fully illustrate the invention.

Referring now more in detail to the embodiment illustrated in the drawings, the construction essentially comprises two overlapping planar members 10 and 11, adapted to be united in facewise contact, by attaching means including rivet holes 12 and rivets 13, against or around a sealing member 14. The inner surfaces 15 and 16 of the planar members are uninterrupted and smooth, requiring no grooving or provision of any other kind of seating means for the sealing member 14. The sealing member 14, when the members 10 and 11 are formed with relatively soft contacting surfaces, may form an impression in the surfaces when the members are united in facewise engagement.

The sealing member 14 preferably consists of a filariform strip of a pre-drawn synthetic fiber-forming material such as one of the polymeric amides known as the nylons. The filariform strip is preferably cylindrical in shape and of the order of .005" in diameter. It possesses considerable flexibility and radial resiliency and is adapted to be elastically deformed into substantially the oval shape shown in Figure 2, the minor axis of the oval being of the order of .0025". The deformed member has a tendency to resiliently reform into cylindrical shape upon removal of compression. Consequently, the surfaces of the oval tend to radially follow-up the working of the faying surfaces and remain in fluid-tight contact therewith. Accordingly, fluid passing the rivet shanks between the faying surfaces 15 and 16 in either direction will encounter a mechanical barrier sufficient to effectively prevent passage of the fluid through the jointure.

Although in its presently preferred embodiment, the filariform component of the joint consists of a nylon, the invention contemplates the employment of any similar elastically deformable, flexible, impervious, tough material capable of being drawn to fine filamentary form.

When the filament is formed of nylon, it may be employed bare, without the presence of a protective coating, particularly in sealing plating joints in pressurized aircraft cabins. For use in sealing tanks containing hydrocarbons, or other fluids in which the filariform element might undergo dissolution or corrosion, or for use in sealing the hulls of marine vessels and water borne aircraft, this element is first coated with a substance insoluble in, and substantially resistive to, the corrosive influences of hydrocarbons, sea water and salt air. This coating material may or may not be of such a nature as to be expandible in the attacking media, and when expandible, augments the elastically deformable sealing effect of the sealing member. An advantageous such protective material consists of the substance sold under the trade name "Thiokol," although "Buna N" is also suitable. Another expandible protective substance for this purpose consists of the synthetic rubber known under the trade name "Neoprene".

In constructing the joint, the overlappable planar members, provided with laterally spaced rows of fastener-receiving openings 12, are overlapped with the sealing member 14 laid down on opposite sides of the rows. In the event of the use of "Thiokol" or "Buna N" as the coating material, the filament is dipped in the cement before installation, and then disposed in place in the tacky condition. The fastening means, such as the rivets shown, are then inserted in the openings therefor and upset, tightening the faying surfaces together against and around the sealing member and establishing a sealed joint impervious to substantially all types of liquids and gases.

We claim:

1. A structural joint comprising: a pair of overlapping planar members; an elongate, pre-drawn single strand filament of a nylon intermediate said overlapping planar members; and a plurality of fastening means holding said overlapping members in facewise engagement and compressing said filament between said planar members.

2. A structural joint, comprising a pair of overlapping planar members; an elongate, pre-drawn single strand filament of a nylon coated with a rubber-like material resistant to dissolution and corrosion intermediate said overlapping planar members; and a plurality of fastening means holding said overlapping members in facewise engagement and compressing said filament between said planar members.

3. A structural joint, comprising a pair of overlapping planar members; an elongate pre-drawn single strand filament of a nylon coated with a rubber-like material resistant to dissolution and corrosion intermediate said overlapping planar members; and a plurality of linearly aligned fastening means extending substantially parallel to said filament holding said overlapping members in facewise engagement and compressing said filament between said members.

4. A method of forming a fluid proof jointure between a pair of members each having at least one substantially planar surface, comprising: drawing an elongate, single filament of a nylon beyond its initial elastic limit; disposing said drawn filament on the planar surface of one of said members; placing the other of said members in an overlapping position relative to the first member with the planar surface thereof in facewise engagement with the planar surface on which said filament is disposed; and fastening said overlapped members together to hold the same in facewise engagement with the drawn filament compressed therebetween to effect the jointure.

5. A method of forming a fluid proof jointure between a pair of members each having at least one substantially planar surface, comprising: drawing an elongate single filament of a nylon beyond its initial elastic limit down to a diameter of the order of .005 inch; applying a film of rubber-like material resistant to dissolution and corrosion to said filament after it has been drawn; disposing said coated, drawn filament on the planar surface of one of said members in substantial parallelism with one margin thereof; placing the other of said members in an overlapping position relative to said first member with the planar surface of the other of said members in facewise engagement with the planar surface on which said filament is disposed; and fastening said overlapped members together to hold the same in facewise engagement with the coated drawn filament compressed therebetween to effect the jointure.

PAUL L. SMITH.
LEWIS E. WILLIAMS, JR.

REFERENCES CITED

The following references are of record in the file of this patent:

UNITED STATES PATENTS

| Number | Name | Date |
|---|---|---|
| 392,931 | Prindle | Nov. 13, 1888 |
| 715,397 | Livingston | Dec. 9, 1902 |
| 1,754,051 | Rosenberg | Apr. 8, 1930 |
| 2,130,948 | Carothers | Sep. 2, 1938 |
| 2,252,554 | Carothers | Aug. 12, 1941 |
| 2,349,290 | Loughborough | May 23, 1944 |
| 2,402,253 | Macleod | June 18, 1946 |
| 2,405,038 | Jennings | July 30, 1946 |